Feb. 16, 1965  J. B. STEWART  3,170,029
RECEPTACLE APERTURE COVER

Filed March 22, 1962  3 Sheets-Sheet 1

WITNESSES

INVENTOR
James B. Stewart
BY
ATTORNEY

Feb. 16, 1965  J. B. STEWART  3,170,029
RECEPTACLE APERTURE COVER
Filed March 22, 1962  3 Sheets-Sheet 2
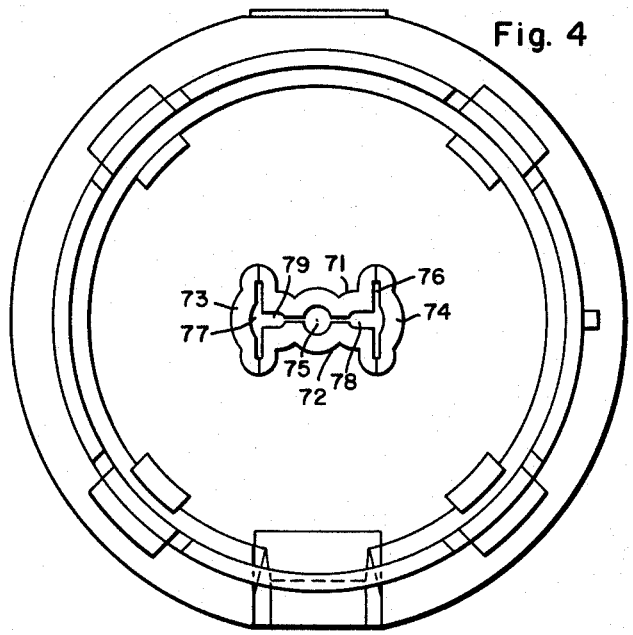
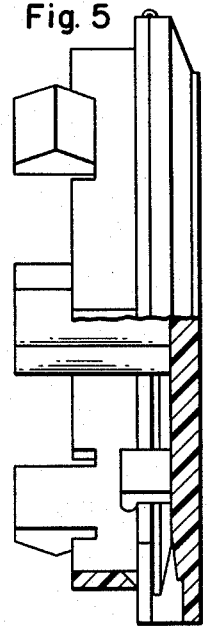
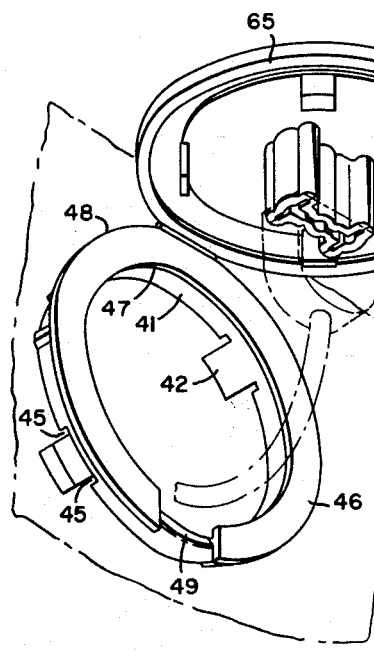
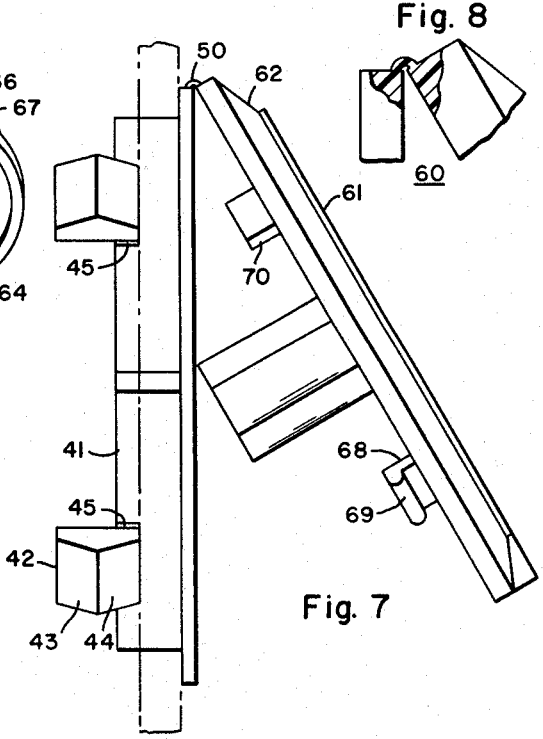

United States Patent Office 3,170,029
Patented Feb. 16, 1965

3,170,029
RECEPTACLE APERTURE COVER
James B. Stewart, Franklin Township, Somerset County,
N.J., assignor to Westinghouse Electric Corporation,
East Pittsburgh, Pa., a corporation of Pennsylvania
Filed Mar. 22, 1962, Ser. No. 181,678
1 Claim. (Cl. 174—66)

This invention relates to a new and improved receptacle cover and more specfically a receptacle cover for use with an electrical cord storage receptacle.

The present invention relates to a cover for a receptacle aperture which includes a unitary molded base and cover having an integral plastic hinge therebetween providing a pivotal cover for a receptacle aperture such as an electrical cord or power line storage receptacle. It has been found that with certain plastics such as polypropylene may be molded in a single piece providing a base which is adapted to be plugged in the aperture of the receptacle and the cover hingedly mounted on the base. The base and cover are made integral with the integral plastic hinge as well as other resilient securing means or tabs on the base and cover. Such tabs would include the tabs by which the base is snapped into or secured to the aperture of the receptacle as well as the resilient means or tabs on the cover which provide a snap connection between the cover and the base. Hence, by a simple unitary mold of plastic, the base, all the snap-in connections, the hinge, as well as the cover may be molded as a unitary device to provide all elements necessary for assembling such as mounting the base on the receptacle aperture and subsequent opening and closing of the cover to provide access to the access aperture defined by the base. In addition, the unitary molded member includes on the cover member at least two resilient integral plastic members extending inwardly from the cover which are closely spaced to provide a releasable gripping action for any electrical connector which defines the end of an electrical conductor being stored in the receptacle.

Accordingly, an object of the invention is to provide a new and improved cover assembly for a receptacle aperture.

Another object of the invention is the provision of a unitary molded plastic member for covering a receptacle aperture wherein all mating or gripping members necessary for mounting such a cover are made of a single molded piece of plastic.

Another object of the invention is to provide a new and improved aperture cover for a receptacle storing an electrical conductor in such a manner so that an electrical conductor stored therein will be easily accessible when the cover to the access aperture is open.

Other objects and advantages of the invention will become apparent by reading of the following specification and examination of the attached drawing, in which:

FIG. 4 illustrates a front elevation view of the aperture cover shown in FIGS. 1 and 2;

FIG. 5 illustrates a side elevation view of the aperture cover shown in FIG. 4, in the closed position;

FIG. 6 illustrates isometric view of the aperture cover of FIG. 5 in a partially opened position;

FIG. 7 illustrates a side elevation view of the receptacle aperture cover embodying the invention, in an open position;

FIG. 8 illustrates a partial cut-away view of the hinge of the aperture cover illustrated in the above figures;

Figure 1:
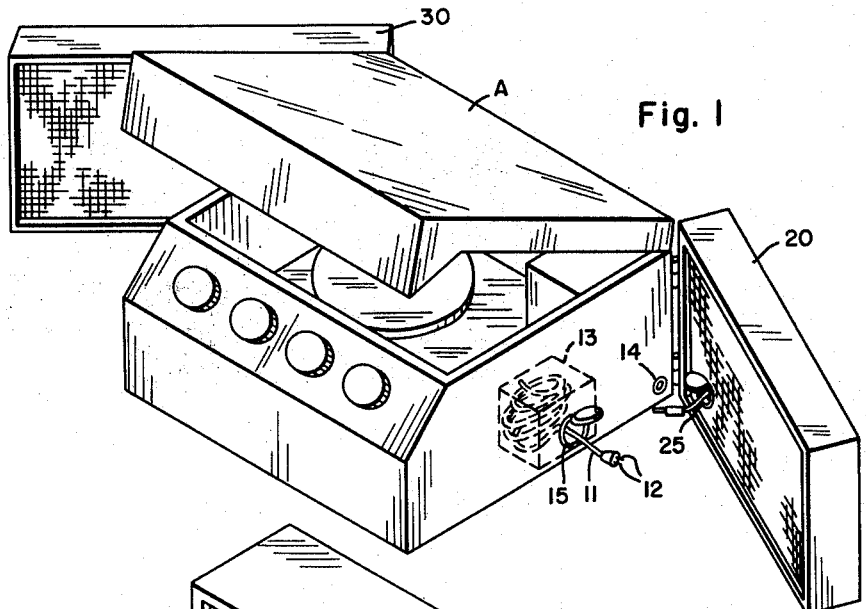
FIGURE 1 illustrates a conventional portable phonograph utilizing an embodiment of the receptacle cover.

Electrical, electronic or electromechanical components such as tape recorders, portable phonographs, speaker enclosures, vacuum cleaners, etc. require relatively long extension cords or conductors. For convenient use of these components, these cords frequently are necessarily relatively long and if the device such as a phonograph or tape recorder, is portable, storing these cords in the components is highly desirable. FIG. 1 illustrates a portable phonograph wherein the record changer and amplifier with the amplifier controls are in one cabinet A with speaker enclosures 20 and 30 hingedly mounted thereon so that the unit can be carried as one unit. When it is desired to play the phonograph, the speaker units 20 and 30 can be removed from the cabinet A and placed a distance therefrom to provide a wider listening area and also enhance the stereophonic effect if the record changer and amplifier in A are of the stereo type. Since such a portable phonograph can be used or may be used in various rooms of a home, the spacing of the speaker units 20 and 30 from the phonograph amplifier unit A may vary considerably as will the spacing of the phonograph amplifier combination A from a power outlet. Hence, an alternating current or power cord 11 of the record changer amplifier A is relatively long to accommodate the unit for various locations. The power cord 11 has thereon an alternating current connecting prongs 12 to be plugged into a conventional alternating current outlet. This cord can be stored in a storage space in the record changer amplifier A in an enclosure or area indicated by 13.

Figure 2:
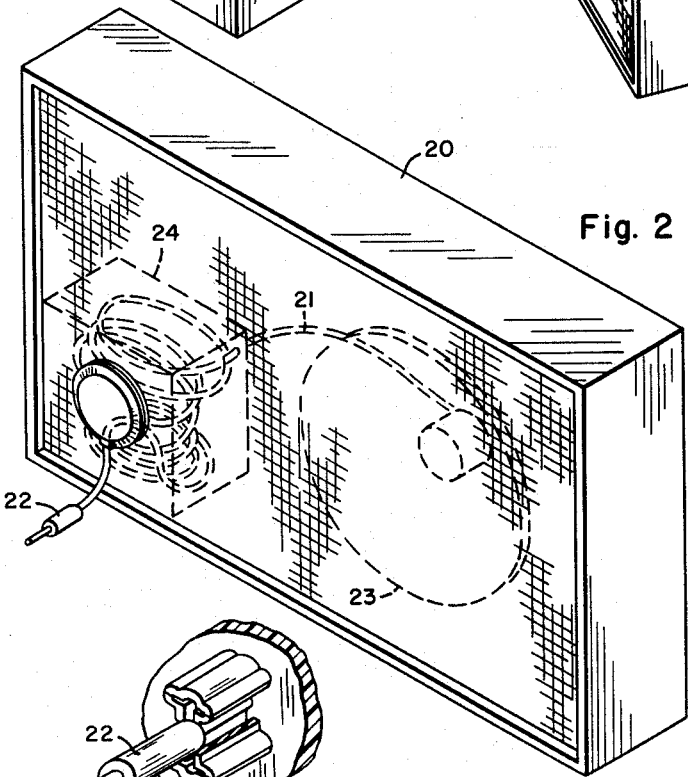
FIG. 2 illustrates a speaker enclosure utilizing a receptacle aperture cover embodying the invention.

The speaker enclosure 20 utilized with the record changer amplifier A is shown in FIGS. 1 and 2 as B. The speaker enclosure 20 and 30 are frequently mounted by some convenient means such as a hinge pin on the record changer amplifier A. Hence, the speaker enclosure may be removed from the combination A and placed in any desirable portion of the room depending upon the length of a speaker cord 21 having a conventional coaxial two terminal output plug 22. This speaker cord is connected at one end to the speaker 23 in the unit 20 and at the other end the coaxial two terminal outlet 22 is connected to a female plug in the record changer amplifier combination 14. The female connection 14 provides the output signal from an amplifier of the record changer amplifier combination A to provide a signal for the speaker 23 in speaker enclosure 20. A similar such arrangement, not shown, is provided for speaker enclosure 30 so as to provide either stereophonic or a space speaker sound. In the speaker unit 20 there is provided speaker cord storage space 24 for the speaker cord 21. The record changer amplifier combination A includes an aperture 15 in the wall of the housing to provide access to the power line storage space 13. Likewise the storage space 24 for the speaker cord 21 has a similar aperture 25 in the speaker enclosure 20 to provide access to space 24. the speaker enclosure 20 to provide access to space 24. The speaker enclosure of unit 20 is of the type which is enclosed on six sides with the exception of the aperture 25 to provide access to the storage space 24 for a speaker cord. There, of course, is also an aperture in the speaker enclosure itself over which the speaker 23 is mounted.

The aperture cover for the speaker enclosure 20 and for the record changer amplifier A is illustrated in detail in FIGS. 4 through 10. This unitary molded plastic aperture cover has a base member 40 which is provided with tabs so as to provide a snap on fit with either the power line circular aperture 15 or the speaker wire circular aperture 25 to be mounted thereon. The base member 40 is made of a molded plastic preferably polypropylene. In addition, the molded plastic receptacle cover includes integral hinge 50 which provides a pivotal movement for a cover member 60 on the base 40. The hinge 50 and the cover member 60 being integral and molded in a unitary piece. The cover 60 has tabs therein to provide releasable locking engagement with the base member 40 so as to provide a snug fit therewith to cover up an access aperture provided by the base member.

Figure 9:
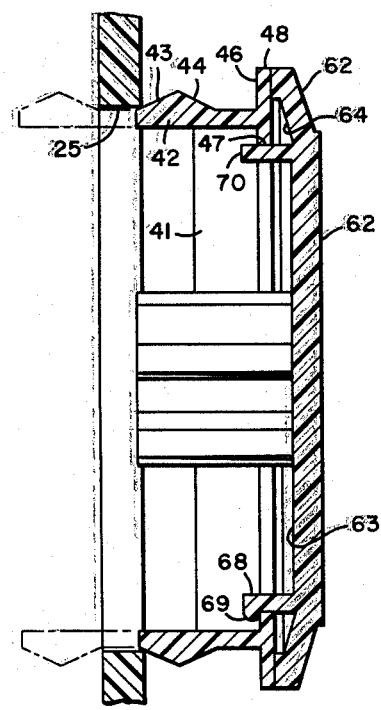
FIG. 9 illustrates a side cross section view of the aperture cover being inserted in a receptacle aperture.
Figure 10:
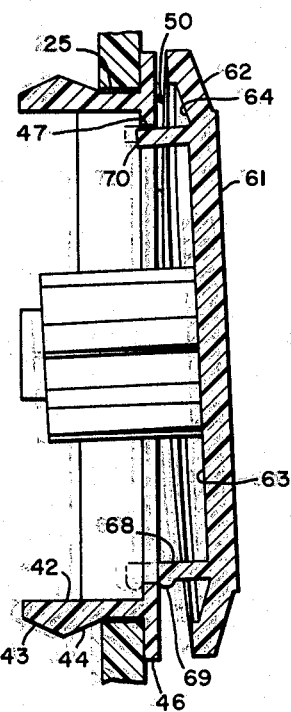
FIG. 10 illustrates a side cross section view of the aperture cover mounted in a receptacle aperture.

The base member 40 includes a ring member 41 which is cylindrical having an outer diameter slightly less than the diameter of the aperture 15 or aperture 25. Extending from one side of the ring member 41 are four resilient plastic snap tabs 42 which are positioned approximately every 90° on the rim or ring member 41. The tabs 42 have cam surfaces 43 and 44 which provide a "roof" type configuration for mounting the base member 40 into the apertures 15 or 25. As shown in FIGS. 9 and 10, the intersection of the surfaces 43 and 44 define a circle having a diameter slightly larger than the apertures 15 and 25. Hence, when the base member 40 is aligned with and pushed inwardly of the apertures 15 and 25, as shown in FIG. 9, the cam surface 43 will force the tab members 42 inwardly so that it may be inserted in the apertures 15 and 25. After the intersection of the cam surfaces 43 and 44 has passed through the aperture 15 or 25, the tabs 42 will snap back into place into a mounting position as shown in FIG. 9. If it is desired to remove the cover from the apertures 15 and 25, the cam surface 44 will be employed to push the resilient tabs 42 inwardly to allow the base member 40 to be removed from aperture 15 or 25. These cams 44 used in removing also serve to take up tolerances in the fitting of the base 40 to the aperture 15 or 25. Relatively small slots 45 are provided on either side of the tab members 42 on the rim 41 to thereby increase the resiliency of the tab member 42.

Secured to the other side of the ring member 41 is a circular rim member 46 which is rectangular in cross section and extends in a plane transverse to the cylindrical ring member 41. The ring member 46 has an inner circular edge 47 which defines an access aperture to provide access for a power line cord or a speaker cord. The rim member 46 also has a circular outer peripheral circular surface 48 which extends outwardly from the ring member 41 having a diameter greater than the diameter of apertures 15 and 25. By extending outwardly from the ring member 41 as shown in FIGS. 9 and 10, in cooperation with the tab members 42 wil provide a relatively secure connection and seal with the apertures 15 or 25. The rim member 46 does not extend entirely around the ring member 41 but described an incomplete circle so that as shown clearly in FIG. 6, there is a recess 49 between the ends of this C-type member rim 46. This opening is relatively small and is in the order of a 10 or 15° opening in the rim member 46. The opening in the rim member 46 cooperates with the side of the record changer amplifier A or the speaker unit 20 to provide recess 49. As will be explained later, the recess 49 cooperates with a similarly positioned or complementary recess on the cover 60 to provide a relatively small opening when the cover 60 is closed so that a power line cord or a speaker cord can be passed therethrough.

Integral with and extending from the base member 40 is a plastic hinge member 50 which is also integral with a plastic cover member 60.

A broken away cross section of the hinge member 50 is illustrated in FIG. 8. This hinge member 50 allows pivotal movement of the cover member 60 from an open position shown in FIG. 6 or FIGS. 1 and 2 to a closed position shown in FIGS. 5 and 4. It has been found in life test that such an integral plastic member made of polypropylene will withstand 90° opening and closing cycles in excess of one million operations.

The cover member 60 as shown in FIGS. 5 through 7, has an outer planar surface 61 which is circular and a frustoconical tapered surface 62. Parallel with the outer planar surface 61 is an inner planar surface 63. Parallel with the conical convex type surface 62 is a frustoconical surface 64. The surfaces 62 and 64 provide a concave configuration for the cover member 60 so as to provide better or a more resilient cover so as to effect a tighter fit between the cover and the base. A circular shoulder portion 65 is provided which extends outwardly from the concave surface 64. This enables a more flexible fit between the cover member 60 and the base member 40 by narrowing the contact therebetween.

Extending outwardly from the frustoconical surface 62 is an outwardly extending U member 66 which, as shown in FIG. 6, provides a recess 67 which cooperates with the recess 49 and the base member 40 to provide access for a power cord or speaker cord and also a gripping means to open the cover. The width and the depth of the recess or aperture 49 and 67 are approximately equal. Extending inwardly from and perpendicular to the inner planar surface 63 are two circularly disposed snap tabs 68 which are located approximately 45° from either side of the center of the recess 67. These tabs, integral with the cover 60 are resilient and have detents 69 thereon to provide a clamping action with the inner side of the rim member 46. As shown in FIG. 4, resilient locking tabs 68 describe a circle at the outer surface thereof having a diameter slightly less than the diameter of the circle defined by the inner surface 47 of the rim 46. The outer surface of the detents 49, however, describe a circle slightly greater than the circle described by the inner surface 47 of the rim 46, as shown in FIG. 4. When the cover member 60, as shown in FIG. 10 is pushed inwardly toward the base member 40, the detents 69 will force the tabs 68 inwardly so as to clamp and securely fit the cover 60 on the base member 40. When the detents pass by the inner surface 47 of the rim 46, the detents will snap back as shown in FIG. 10 and provide a positive clamping action between the cover 60 and the base member 40.

Extending inwardly from the surface 63 of the cover member 60, are circularly disposed guide tabs 70 which have an outer circular surface as shown in FIG. 4 that describe a circle approximately equal in diameter and coincident with the circle defined by the inner surface 47 of rim 46. These guide tabs 70 act to provide alignment when the cover 60 is closed and releasably locked by the snap tab 68. Hence, when the cover is closed, it will be secured by snap tabs 68 at the outer periphery at the free side of the cover member 60 and also by the hinge 50. The guide tabs 70 are located approximately 90° apart and diametrically opposite to one of the snap tabs 68.

Figure 3:
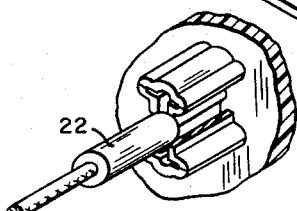
FIG. 3 illustrates a cut-away portion of the receptacle of the aperture cover shown in FIGS. 1 and 2.

Located centrally of the inner planar surface 63 are four gripping members 71 and 72, 73 and 74. These gripping members are integral with the cover 60 and are constructed of a molded plastic so that they are resilient. The members 71 and 72 are spaced and provide a gripping recess 75 therebetween for gripping the shielded conductor plug of a conventional connector 22 as shown in FIGS. 2 and 3. The gripping aperture 75 is conical and the spacing between the gripping members 71 and 72 increases between the outer edge as shown in FIG. 4 and the base connection with the inner planar surface 63. More specifically, the spacing therebetween is triangular in shape since the gripping members 71 and 72 are tilted toward each other. The opening to the gripping recess 75 is slightly smaller than the connector to be gripped thereby.

Gripping member 74 cooperates with both gripping members 71 and 72 to provide a gripping recess 76 therebetween for gripping the prong of a conventional alternating current plug. Similarly, gripping member 73, as shown in FIG. 4, cooperates with gripping members 71 and 72 to provide a recess, rectangular in cross section, for gripping the other prong of an alternating current plug. The prong gripping members 73 and 74 are tilted inwardly toward the gripping members 71 and 72 as shown in FIG. 6 to provide a triangular-shaped spacing therebetween so as to afford a resilient gripping action on the alternating current prongs 12. More specifically, the prong gripping members 73 and 74 extend outwardly from the inner planar surface 63 at an angle toward the gripping members 71 and 72. This effects a proper resilient gripping force for gripping an alternating current prong 12 since the width of the gripping recesses 76 and 77 is smaller than the width of the conventional prong. Hence, as the prongs are forced inwardly through the recesses 76 and 77, the prong gripping members 73 and 74 will be forced outwardly by the prongs. Further, recesses 78 and 79 are provided between gripping members 71 and 72 so that more than one connector 22 may be secured to cover 60.

Thus, it is seen that the unitary receptacle cover is mounted in either a power line storage aperture 15 or a speaker storage aperture 25 by pushing the base member 40 inwardly so that the inner edge of the aperture in co-operation with the cam surfaces 43 of the resilient tabs 42 will force the tabs 42 inwardly and secure as shown in FIG. 9 to provide a secured connection in the apertures. Cam surfaces 44 are instrumental in securing a tight fit and allowing for tolerances.

The cover 60 can be opened by placing a finger or other instrument in the recess defined by recesses 49 and 67 and the alternating current plug can be plugged into the prong recesses 76 and 77 so that the alternating current outlet line will be readily accessible when the cover is subsequently opened. If the receptacle cover is utilized in a speaker unit 20, as shown in FIGS. 2 and 3, the prong of the outlet plug 22 can be forced inwardly through the recess 75 to effect a gripping action on the outlet prong. Hence, as shown in FIGS. 2 and 3, when it is desired to connect the prong of the female unit 14, and position the speaker unit 20 remote from the unit A, the cover 60 is opened and the plug 22 is removed from the recess 75 and the cord or conductor 21 is fitted into the recesses afforded by recesses 49 and 75 and the cover can then be closed. This enables the complete enclosure for the speaker, such as described or conventionally known as an infinite baffle type enclosure.

Although this invention has been described in connection with a specific embodiment, it will be apparent to those skilled in the art that changes and arrangements in part can be made to suit the requirements without departing from the spirit and scope of the invention.

I claim as my invention:

A unitary cover for a receptacle for passing therethrough an electrical cord having an electrical plug at one end thereof comprising, a molded plastic base member having a plurality of flexible integral tabs extending from one side thereof to provide a snap fit with the sides of said aperture, said base member having a rim member with the inner edge defining an access aperture to said receptacle, a molded plastic cover member, a relatively thin plastic hinge member integral with said base member and said cover member to provide pivotal movement of said cover member toward and away from the other side of said base member, integral resilient plastic tabs on said cover member to provide a snap-on fit with said rim member, and a pair of adjacent flexible grip members fixed on the surface of said cover member adjacent said aperture extending inwardly toward said base member, said flexible grip member releasably frictionally gripping the electric plug of said electric cord so that when said cover member is open said electric plug will be readily accessible.

References Cited in the file of this patent
UNITED STATES PATENTS

| | | |
|---|---|---|
| 945,753 | Chamberlain et al. | Jan. 11, 1910 |
| 2,084,953 | Gibson | June 22, 1937 |
| 2,470,320 | Page | May 17, 1949 |
| 2,487,883 | Le Baron | Nov. 15, 1949 |
| 2,942,226 | Low | June 21, 1960 |
| 3,007,599 | Greasley | Nov. 7, 1961 |
| 3,013,105 | Craig | Dec. 12, 1961 |
| 3,021,976 | Tracy | Feb. 20, 1962 |
| 3,075,627 | Kuckoff | Jan. 29, 1963 |